United States Patent [19]

McGuire et al.

[11] Patent Number: 5,033,988
[45] Date of Patent: Jul. 23, 1991

[54] REVERSIBLE ENDLESS BELT ROTARY COUPLING

[75] Inventors: Dennis P. McGuire; J. Brian Watson, both of Erie, Pa.

[73] Assignee: Lord Corporation, Erie, Pa.

[21] Appl. No.: 320,205

[22] Filed: Mar. 7, 1989

[51] Int. Cl.$^5$ .............................................. F16D 3/78
[52] U.S. Cl. .................................... 464/69; 464/93
[58] Field of Search ....................... 464/69, 85, 92, 93, 464/94, 95

[56] References Cited

U.S. PATENT DOCUMENTS

| | | | |
|---|---|---|---|
| 1,316,903 | 9/1919 | Kuentzel | 464/69 |
| 2,945,365 | 7/1960 | Ulderup et al. | 464/93 |
| 3,668,891 | 6/1972 | Brizzolesi | 464/85 X |
| 4,118,952 | 10/1978 | Kobayashi | 464/69 |
| 4,188,802 | 2/1980 | Zeidler et al. | 464/93 X |
| 4,377,386 | 3/1983 | Hannibal | 464/69 |
| 4,790,794 | 12/1988 | Takeda et al. | 464/93 |

FOREIGN PATENT DOCUMENTS

| | | | |
|---|---|---|---|
| 44-29322 | 11/1969 | Japan | 464/85 |
| 292924 | 12/1987 | Japan | 464/69 |
| 321999 | 11/1929 | United Kingdom | 464/93 |
| 1054075 | 1/1967 | United Kingdom | 464/93 |

*Primary Examiner*—Daniel P. Stodola
*Attorney, Agent, or Firm*—Haynes and Boone

[57] ABSTRACT

A reversible endless belt rotary coupling particularly suited for use in connecting a drive shaft and driven shaft permitting the driven shaft to rotate in either, rotational direction and to rotate about an axis that may be angularly misaligned with respect to the rotational axis of the drive shaft. The coupling includes a series of preloaded endless belts embedded in an elastomer matrix material, arranged tangentially with respect to the connected shafts and connected thereto by bobbin-like spools at the ends of the belts. The endless belts are axially stiff to accommodate tensile and compression loads and are flexibly and torsionally soft to accommodate the motion while transferring torque between the drive and driven shaft.

5 Claims, 8 Drawing Sheets

REVERSIBLE ENDLESS BELT ROTARY COUPLING

FIELD OF INVENTION

The present invention relates to rotary mechanical couplings, and more particularly, the present invention relates to such couplings of the type which include a plurality of endless belts connected between adjacent drive and driven sides for transferring torque from one to the other in any rotary direction while accommodating misalignment between their rotational axis.

BACKGROUND OF THE INVENTION

Flexible couplings for connecting adjoining shafts which may have their axes misaligned either through installation error or by design are well-known in the prior art and available for many applications. Most prior art flexible coupling designs, however, are limited in capability both as to durability and the degree of angular or axial misalignment permitted between the adjoining shafts (e.g., a drive shaft and load shaft). A few existing couplings utilize elastomeric material to accommodate misalignment, but they generally lack torsional stiffness and relative to their size can only transmit small amounts of torque. Conventional nonelastomeric types of flexible couplings, including the Cardan type of universal joint, permit a relatively high degree of shaft misalignment but do not provide a constant velocity relationship between the rotating shafts. Specialty mechanical couplings have been designed to provide such a constant velocity relationship, but these joints include bearings and a seal which must be lubricated and are subject to failure.

As an alternative to prior art couplings utilizing elastomeric material, and those universal joints such as the Cardan type, endless belt type couplings have been developed to enhance angular and axial misalignment accommodation capability of the coupling while providing sufficient torsional strength. Such couplings include a plurality of individual, flexible endless belt elements connected to one another and the connected members by bolts, pins or similar means. The endless belt elements are typically of equal length and form flexing structures consisting of a plurality of elements connected together in a variety of symmetrical patterns including generally square, polygonal or circular (e.g., octagonal, hexagonal) configurations. At least two flexing structures are joined together to form the link coupling, which in turn is connected at each end to the flange of the shafts to be joined. Disclosure of such couplings can be found in U.S. Pat. Nos. 4,790,794 and 4,377,386.

Endless belt type couplings provide numerous advantages over flexible type couplings including weight reduction, environmental resistance to corrosive elements, wear resistance and nonlubrication. Use of such couplings has been expanding to many applications. However, known endless belt type couplings are limited to use in applications where rotation is continuous in one direction. This limitation results from undesirable shrinkage and expansion the existing couplings undergo during torque reversals. Such shrinkage and expansion of the coupling is avoided during continuous unidirectional rotation of the coupling. Arrangement of the endless belts in the attachment of the drive and driven members results in continuous tension of the coupling during continuous unidirectional rotation regardless of direction. The belts are alternatively arranged into two groups, a first group of belts having a leading portion attached to the drive member and a trailing portion attached to the driven member, and a second group of belts each having a leading portion attached to the driven member and a trailing portion attached to the drive member. The terms leading and trailing are used as references of the ends of the belts with respect to rotation in one direction. For rotation in one direction, clockwise for example, torque is transferred from the drive to driven members by the "pull" of the belts placing each belt of the first group in tension. Belts of the second group are placed in minor compression but do not otherwise effect direct torque transfer between the members. Virtually all the torque transfer is carried by the belts of the first group, which are very soft in compression carry virtually none of the torque transfer between the members. This physical characteristic is normally described as the non-linearity load deflection characteristic of the individual belts. For rotation in the opposite direction the roles of the two groups of the endless belts are reversed.

The above-described arrangement of the known endless belt type coupling is satisfactory when rotation is continuous in either direction or when the rotation is slowly reduced to zero and then reversed on an intermittent basis. However, such couplings have undesirable dynamic characteristics that result in damage to the coupling and premature failure if the coupling is subjected to sudden rotation reversals. As shown in FIG. 6A, the known endless belt type couplings have a distinct non-linearity or a flat spot in their torque-deflection curves at zero torque. The non-linearity illustrates the shrinkage or contraction of the coupling from the compression mode, much like an ordinary rubber band upon release from stretching. Sudden rotation or torque reversals of the coupling results in "snapping" of the coupling between opposite tension modes. Furthermore, such couplings have been found to be laterally soft, resulting in an initial deflection of the center of axis of the coupling from the axis of rotation when couplings are used in conjunction with horizontal shafts. Such deflection results in an out of balance condition on the coupling upon rotation. Known endless belt couplings fail when subjected to sudden reversals as described above. This problem as shown in the non-linearity in their torque-deflection curves requires solution before such endless type couplings can be used in numerous reversible coupling applications.

Numerous applications of reversible endless belt type couplings exist. One such application is in cooling towers having fans that operate at high speeds and high torque in either rotary direction. Cooling towers are used in power plants, industrial plants and ships to continuously cool large quantities of water. Such water is generally chlorine treated to reduce bacteria growth. Requirements of couplings in such environments include sudden reversal rotation in either direction, misalignment up to about 5°, operating speeds up to about 7000 rpm and a continuous torque capacity of about 15,000 to about 40,000 in/lb with intermittent loads up to about 80,000 in/lb. Furthermore it is desirous the coupling withstand the environmental effects of chlorinated water.

One significant problem of cooling tower drive systems is the changing amount of misalignment. Cooling tower structures are generally of wood construction that can dimensionally change due to changing climatic conditions. Such structural changes result in variance in the misalignment of the drive system up to about 5°. Another problem results from the sudden reversal of the direction of rotation of the drive shaft. Air flow in cooling towers is reversed for such purposes as melting ice from the structure. Often times the direction of rotation is suddenly reversed resulting in peak torque loads on the coupling.

One type of flexible coupling currently used in cooling tower drive systems is a stainless steel metal diaphragm coupling. However, such couplings are limited to maximum misalignment up to 1° and lack environmental resistance to chlorinated water. Replacement of such couplings is generally required after a short period of continuous service. The use of such a coupling to solve the aforementioned cooling tower drive system problems has not proved satisfactory because of the foregoing shortcomings.

It is important that a suitable coupling for a cooling tower drive system be compact, lightweight, easy to maintain and capable of withstanding rotation in any direction. Such a coupling must also have a predictable longer service life, operate satisfactorily without requiring lubrication and operate under misalignment up to 5°.

While there are numerous available flexible couplings and endless belt type couplings suitable for unidirectional rotation, there is not currently available an endless belt type reversible coupling capable of meeting the aforedescribed conditions imposed in connecting a cooling tower fan to a drive motor in a manner permitting the cooling tower fan to rotate about an axis inclined at an angle up to about 5° with respect to the drive motor shaft while permitting transfer of high speed and high torque between the motor and the fan.

OBJECTS OF THE INVENTION

With the foregoing in mind, a primary object of the present invention is to provide a novel reversible flexible endless belt type coupling particularly suitable for use in connecting an air fan to a drive shaft in a cooling tower.

Another object of the present invention is to provide an improved reversible flexible endless belt type coupling capable of transmitting motion under conditions of high torque and substantial misalignment between drive and driven members in any direction of rotation.

Another object of the present invention is to provide an improved reversible flexible endless belt type coupling having the dynamic characteristic of a linear torque-deflection curve that passes through zero torque.

Another object of the present invention is to provide an improved reversible flexible endless belt type coupling having sufficient stiffness to substantially eliminate lateral deflection from the rotational axis.

A further object of the present invention is to provide a reversible coupling capable of long life in the environment of chlorinated water.

Yet another object of the present invention is to provide a reversible compact, lightweight endless belt type coupling which is capable of transmitting high torque over a predictable service life not requiring lubrication.

The present invention features a unique method of establishing reversible coupling between members rotatable about misaligned axes without frequent replacement.

It is a feature of this invention to have a flexible endless belt type coupling capable of transmitting motion under conditions of high speed, high torque and substantial misalignment between drive and driven members in any direction of rotation and sudden reversals therebetween.

It is another feature of this invention to resist degradation due to chlorinated water.

Another feature of this invention is the long service life in coupling a cooling tower fan to a drive shaft.

An advantage of this invention is the reversible endless belt type coupling provides long service life without maintenance.

More specifically, the present invention provides an improved, reversible endless belt type coupling particularly suited for connecting a driven shaft to a drive shaft in cooling towers but also capable of being utilized in other applications where torque and high speed can be transmitted in any direction of rotation about misaligned intersecting axes including sudden reversals of such rotation. The coupling comprises drive side connecting elements for connection to the hub of a shaft, driven side connecting elements for connection to the hub of another shaft that may be misaligned with the shaft axis, bobbin-like collars mounted on the outer peripheries of the drive side and driven side connecting elements, and a plurality of endless belts composed of fiber bundles drivingly interconnecting the drive and driven members. Each endless belt has one end wrapped around a collar mounted on the drive side connecting elements and another end wrapped around another collar mounted on the driven side connecting element for motion tangentially in an annular path. The collars have a U-shaped cross section defined by radially extending flanges to accommodate the endless belts. An elastomer matrix embeds the fiber bundles together with the collars. Each endless belt is preloaded in tension in excess of about 5% of the ultimate strength of the endless belt to accommodate tension and compression loads. When mounted in the coupling, the endless belts are arranged with their collars axes disposed parallel with respect to the rotational axis of their respective connected members. The coupling of the present invention operates to provide rotation in any direction by a method wherein the endless belts are preloaded in tension to avoid compression under various operating conditions.

BRIEF DESCRIPTION OF THE DRAWINGS

The foregoing and other objects, features and advantages of the present invention should become apparent from the following description, when taken in conjunction with the accompanying drawings in which.

DESCRIPTION OF THE PREFERRED EMBODIMENTS

Figure 1:
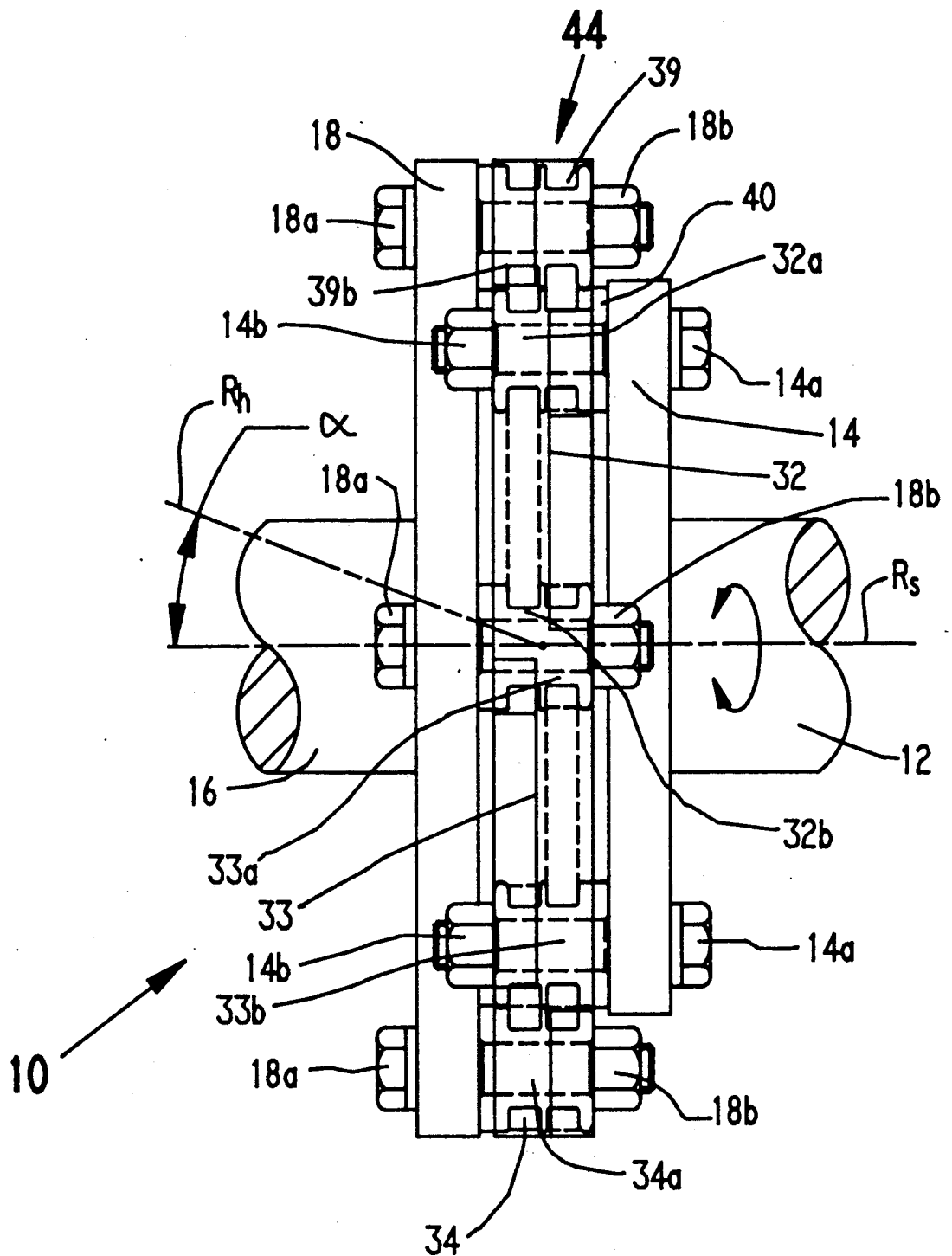
FIG. 1 is a simplified illustration of a endless belt type coupling of the present invention showing the disposition of various components when used to connect axially aligned shafts.

Referring now to the drawings, FIG. 1 illustrates a reversible endless belt type coupling 10 embodying the present invention. As will be discussed more fully hereinafter, the coupling 10 includes a plurality of preloaded endless belts for transferring torque in any rotational direction between the motor drive shaft and the fan shaft while permitting the shaft to rotate about an axis $R_h$ misaligned at an angle $\alpha$ with respect to the rotational axis $R_s$ of the motor drive shaft. Axial loads in tension or compression are carried by the preloaded endless belts. As a result, the coupling of the present invention is particularly well suited for accommodating sudden reversals in rotation in any direction as well as for accommodating substantial misalignment of the fan shaft to its motor shaft.

Figure 2:
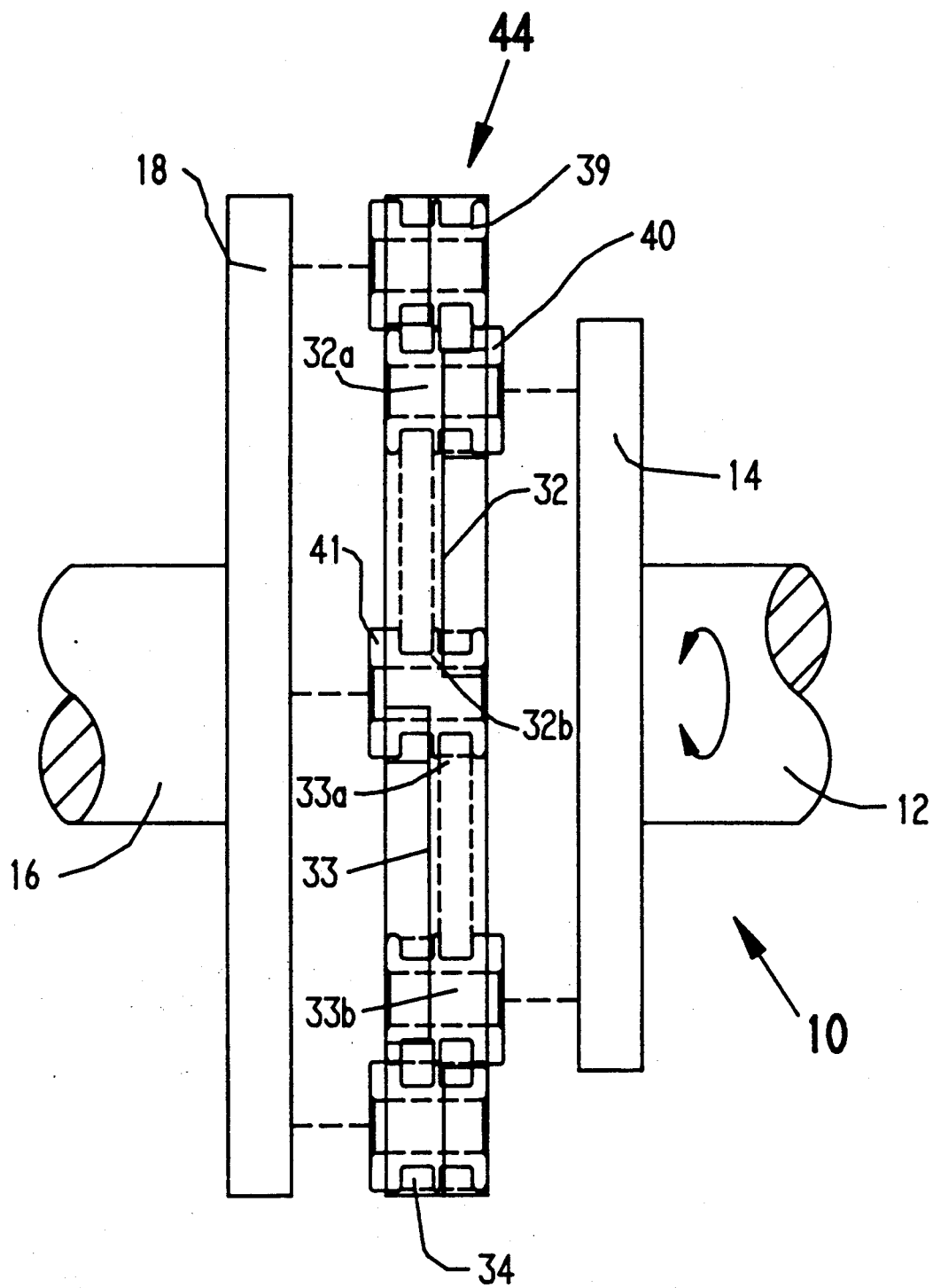
FIG. 2 is and exploded view illustrating various components of the coupling assembly illustrated in FIG. 1.

Referring now to FIGS. 1-3, the coupling 10 is shown connecting a drive shaft 12 rotatable about a horizontal axis $R_s$ to a driven shaft 16 rotatable about an axis $R_h$ that may be misaligned at an angle $\alpha$ with respect to the rotational axis $R_s$ of the drive shaft 12. A drive member, or hub 14 is secured to the drive shaft 12 by conventional means (not shown) such as bolts, weldments, splines, keys, or the like. A hub 18 is similarly connected to the driven shaft 16. In the illustrated embodiment, the hubs 14 and 18 include flat circular plates; however, it should be understood that the hubs 14 and 18 may include conventional spiders having arms extending radially outwardly from the shafts 12 and 16 in angularly offset relation in a plane orthogonal to the shaft rotational axes.

Figure 3A:
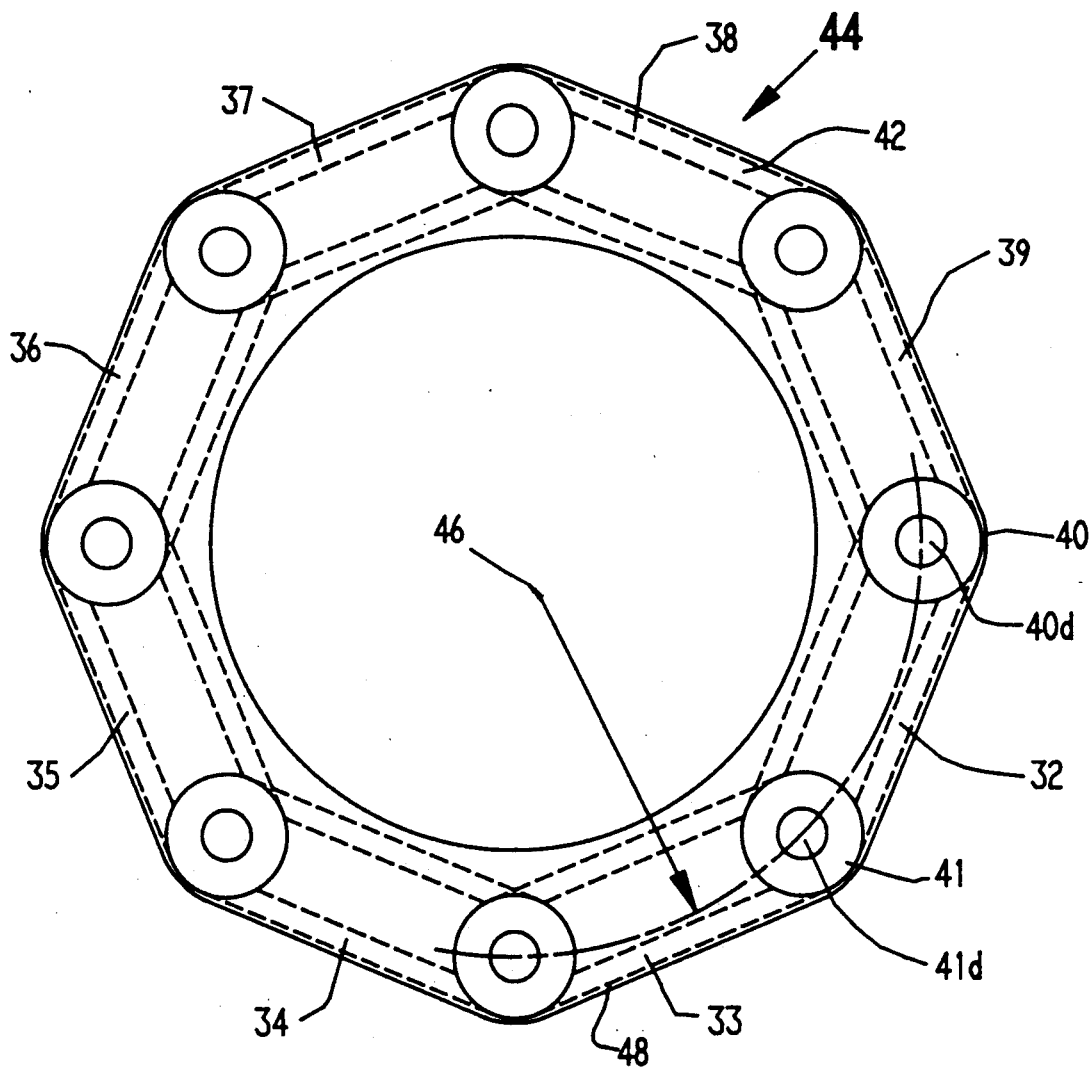
FIG. 3A is a plan view showing the endless belts connected together about the collars, and the loading the endless belts relative to the radius of the center line of the collar bores.

To accommodate angular misalignment between the rotaional axis $R_s$ of the drive shaft 12 and the rotational axis $R_h$ of the driven shaft 16, such as the misalignment angle $\alpha$ (FIG. 1) a plurality of endless belt type connecting elements 32, 33, 34 and 39 are shown disposed between the hubs 14 and 18 and are interconnected therewith. As shown in FIGS. 1 and 2, each connecting element such as the element 32 for purposes of illustration, has a first end 32a and a second end 32b, wherein either the first or second end may be a leading or trailing end as defined with respect to the direction of rotation of the drive shaft 12. For instance, for clockwise rotation of the coupling 10, first end portion 32a is a leading end, pulling the connecting element 32. For counterclockwise rotation, first end portion 32a is a trailing end, pushing the connecting element 32. In the illustrated embodiment as shown in FIG. 3A, eight such elements 32, 33, 34, 35, 36, 37, 38 and 39 are provided between the hubs 14 and 18, wherein FIG. 1 shows elements 32, 33 along with the first end 34a of element 34 being illustrated adjacent the second end 33b and the second end 39b of element 39 adjacent the first end 32a of the element 32. The fifth through eighth elements 35, 36, 37 and 38 are omitted from FIG. 1 for reasons of clarity but are located immediately behind the elements 32, 33, 34 and 39 shown in the foreground of FIG. 1. While an eight element coupling 10 is illustrated, it should be understood that various numbers of elements may be utilized, depending upon design parameters, including spatial and loading requirements, and the like, but at least four elements spaced apart equiangularly are required to ensure suitable driving relation between the shafts 12 and 16 when misaligned.

Each connecting element has one end portion connected to the drive hub 14 and the other end portion connected to the driven hub 18 such that successive connecting elements are oppositely connected to the drive and driven members. That is, for successive elements 32 and 33, connecting element 32 has its first end portion 32a connected to the drive hub 14 and connecting element 33 has its first end portion 33a connected to the driven hub 18. The four alternative elements 32, 34, 36 and 38 form a first group of connecting elements each having their first end portion connected to the drive hub 14 and their second end portion connected to the driven hub 18, and the four intermediate elements 33, 35, 37 and 39 form a second group of connecting elements, each having their first end portion connected to the driven hub 18 and their second end portion connected to the drive hub 14. The described connection of the connecting elements to the drive and driven hubs provides the first group of connecting elements to be in tension and the second group of connecting elements to be in slight compression for rotary motion in one direction and the modes of tension/compression reversed for rotary motion in an opposite direction.

Each connecting element of the first group of connecting elements, such as element 32, has its first end portion 32a connected to the drive hub 14, as by a bolt 14a connected to the drive hub 14, and has its second end portion 32b connected to the driven hub 18 as by a bolt 18a. The drive hub bolt 14a is located radially outward of the rotational axis $R_s$ of the drive shaft 12 and extends in a plane parallel to the rotational axis $R_s$. In like manner, the driven hub bolt 18a is located radially outward with respect to the rotational axis $R_h$ of the driven shaft 16 and extends parallel with respect to axis $R_h$. Thus, the bolts 14a and 18a are disposed in spaced confronting relation with respect to one another but are circumferentially offset as shown in FIG. 1. Each connecting bolt 14a, 18a extends transversely through the connecting element and one of the respective hubs 14 and 18. Each connecting element of the first group is connected by bolts 14a, 18a to its associated hub 14, 18 respectively.

Similarly, each connecting element of the second group, such as element 33 has its first end portion 33a connected to the driven hub 18, as by a bolt 18a connected to the driven hub 18, and has its second end portion 33b connected to the drive hub 14 as by a bolt 14a.

With the rotational axes of the shafts 12, 16 aligned, i.e., arranged coaxially as illustrated in FIG. 1, the connecting elements, such as elements 32, 33 of the coupling 10 advance endwise in a plane orthogonal to the rotational axis $R_s$ of the aligned shafts 12 and 16. In order to transmit torque in any rotational direction and capable of withstanding sudden reversals each individual connecting element is axially stiff. In other words, the connecting elements resist axial deflections caused by tensile and compressive loads. To this end, the connecting elements are capable of pulling the fan shaft with minimal axial deflection during either continuous rotation or sudden reversals in rotation.

However, when the fan shaft 16 is misaligned with respect to the shaft 12 such as when it is displaced through the angle $a$, and the shafts 12 and 16 rotate, the connecting elements move in a complex manner when transmitting torque between the input drive hub 14 and the output driven hub 18. For instance, when the shafts 12, 16 are aligned, the connecting elements advance endwise tangentially of the axis $R_s$ substantially in the orthogonal plane to the rotational axis $R_s$. However, when the driven hub 18 and its shaft 16 are offset angularly, and rotation about the axis $R_s$ is clockwise, the first end portions of the connecting elements of the first group remain substantially in the orthogonal plane, but the second end portion thereof are cyclically displaced axially above and below the orthogonal plane. Such displacement causes a change in the angular displacement between the bolts 14a, 18a which must be accommodated dynamically by the connecting elements in order to ensure torque transmission between the hubs 14 and 18. To accommodate such displacements each connecting element is flexurally and torsionally soft, allowing for flexural and torsional deflection caused by misalignment.

The connecting elements must accommodate rotation about the $R_s$ axis in either direction and sudden reversals thereof. For clockwise rotation about the $R_s$ axis, the first end portions of the connecting elements of the first group advance endwise tangentially of the axis $R_s$ as a result of direct fixation to the drive hub 14. The second end portions of the connecting elements of the second group trails the first end portions, pulling the driven hub 18 by the direct fixation therebetween. Such motion causes the connecting elements of the first group to be pulled in tension. Simultaneously, the second end portions of the connecting elements of the second group similarly advance as a result of direct fixation to the drive hub 14. The first end portions of the connecting elements of the second group are directly connected to the driven hub causing the connecting elements of the second group to be pushed in compression. Counterclockwise rotation results in the reversal of the above process of rotation. Such changes in rotation cause a change in the operating mode of the connecting elements which must be accommodated dynamically thereby to ensure torque transmission between the hubs 14 and 18.

Figure 3B:
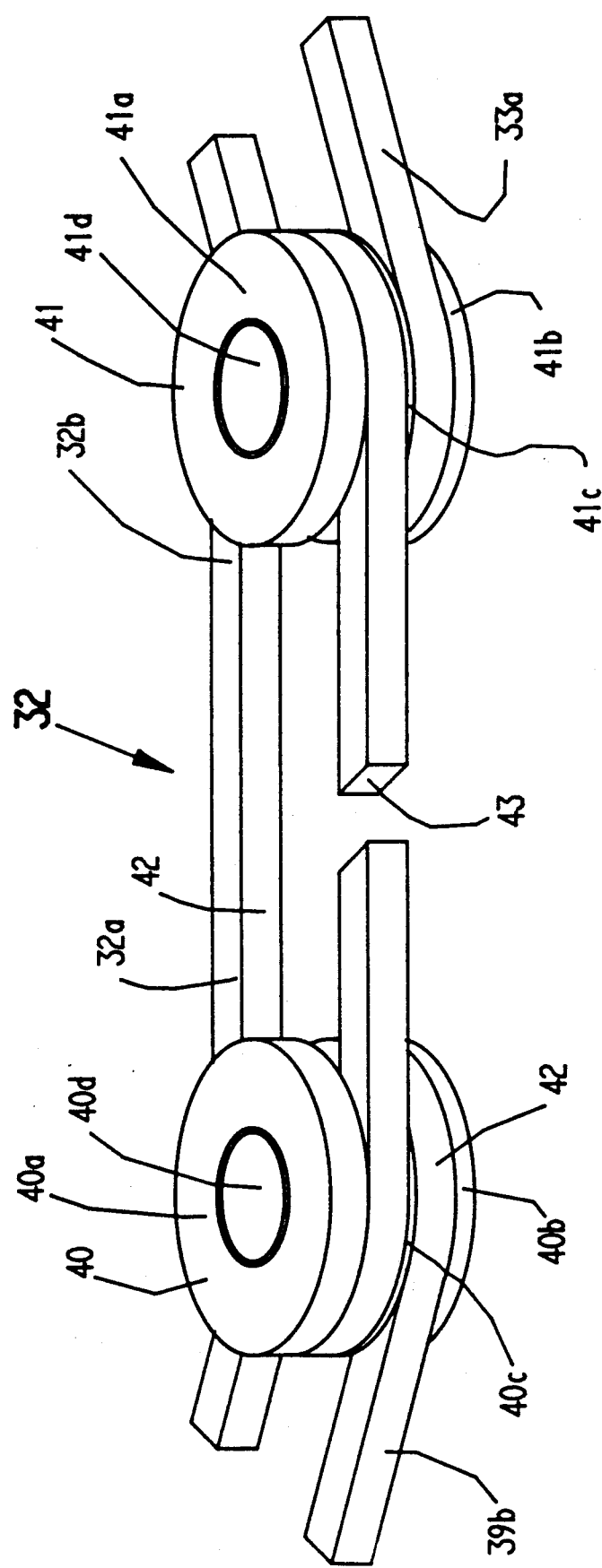
FIG. 3B is a fragmentary perspective view illustrating the endless belts connected together about the collars.

In order to transmit torque while accommodating the aforementioned connecting element motions and tension/compression requirements, each connecting element, such as the connecting element 32 is provided with a first end spool 40 mounted in its first end portion 32a and a second end spool 41 mounted in its second end portion 32b. As shown in FIGS. 3A and 3B, the first end spool 40 further serves as an end spool for the second end portion 39b of adjacent connecting element 39 and second end spool 41 further serves as an end spool for the first end portion 33a of adjacent connecting element 33. The spools 40 and 41 are bobbin-like, each having two radially outwardly extending end flanges 40a, b, and 41a, b, respectively and an intermediate flange 40c, 41c extending radially outwardly. Between the respective end flanges and the intermediate flange are two "U" shaped portions. Extending through each spool 40, 41 is a bore 40d, 41d through which passes a means to connect the spool to a hub. The spool is flexurally stiff resisting deflections thereof. To this end, the spools 40, 41 are preferably fabricated of strong lightweight metal such as stainless steel, or the like, but they may be of other strong lightweight materials, including composites or rigid thermoplastics.

The spools 40 and 41 are connected together by a continuous endless belt 42 wrapped about the spools to be fitted and retained in the "U" shaped portions thereof. Each endless belt 42 is composed of coated fiber cord bundles which are formed by winding reinforcing high strength cords 43 such as Kevlar ® polyarimid fibers in multiple plies and multiple rows in a loop fashion. The reinforcing cords in the present embodiment are Kevlar ® 1500/1/3, a polyarimid fiber having a cross-sectional area of about $5.27 \times 10^{-4}$ in$^2$, a tensile strength of about 160 pounds and a % elongation of break of about 4%. The denier is about 1500. There are 3 individual fibril threads where all three fibrils are twisted about each other in one twist. Each of the fiber cord bundles is coated or impregnated with a matrix material such as epoxy, urethane or some other polymeric material. The endless belt 42 is formed by looping the coated fiber cord about two spaced mandrels. The number of loops used to form the endless belt 42 may be varied depending on the torque carrying and flexibility requirements of the particular application for which the coupling is to be utilized.

As shown in FIG. 3A, eight spools and eight endless belts are assembled into a connecting member 44 suitable for placement between drive and driven hubs. Assemblage of the connecting member 44 is done on a radially expanding device having mandrels extending outwardly to pass through the bores 40d, 41d of the spools 40, 41. A loosely assembled connecting member 44 composed of the interconnected eight spools joined by the endless belts is placed on the radially expanding device.

Figure 6A:
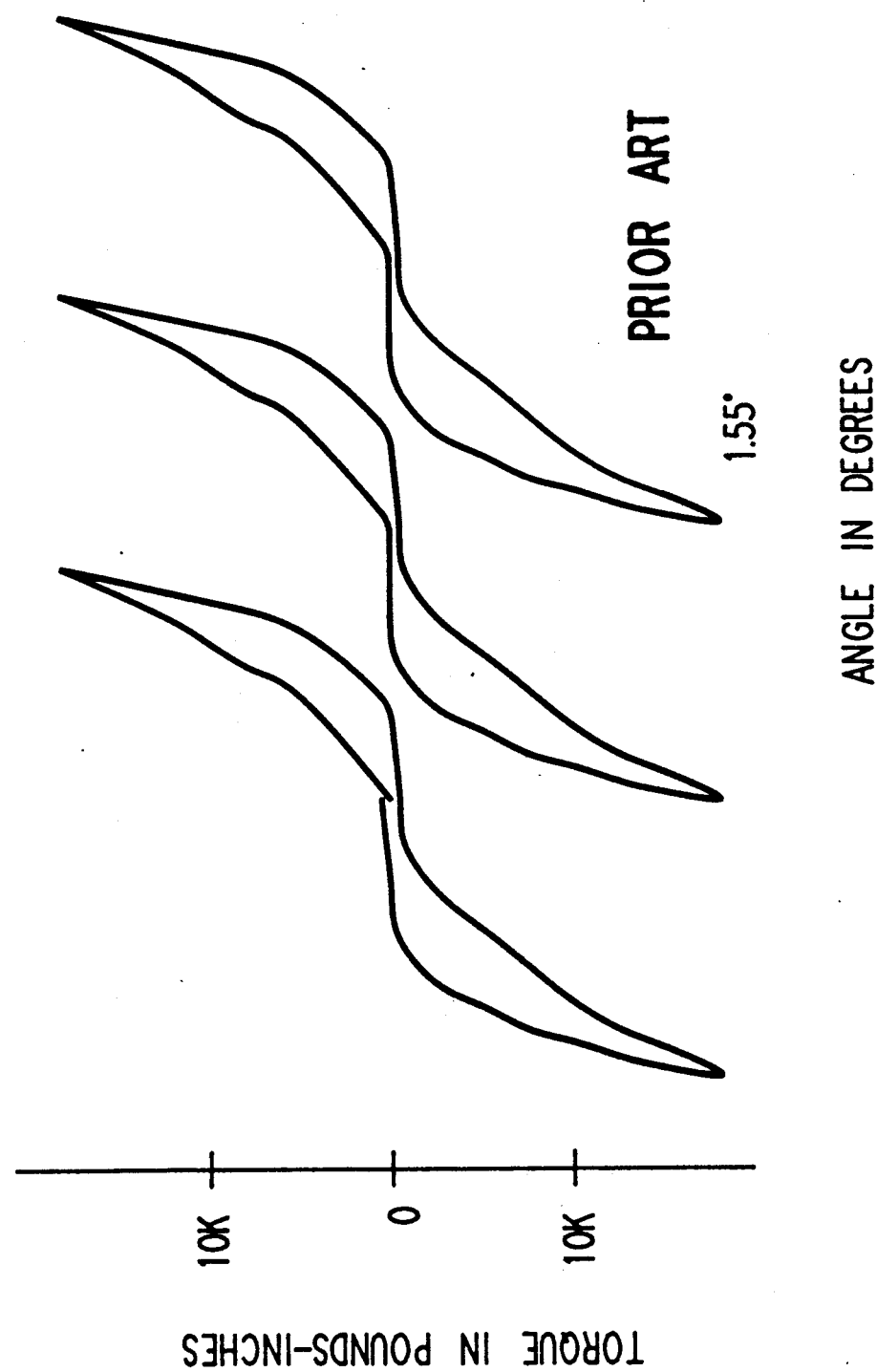
FIG. 6A is a graph of the torque-deflection of a coupling of the prior art illustrating the flat spot at zero torque.
Figure 6B:
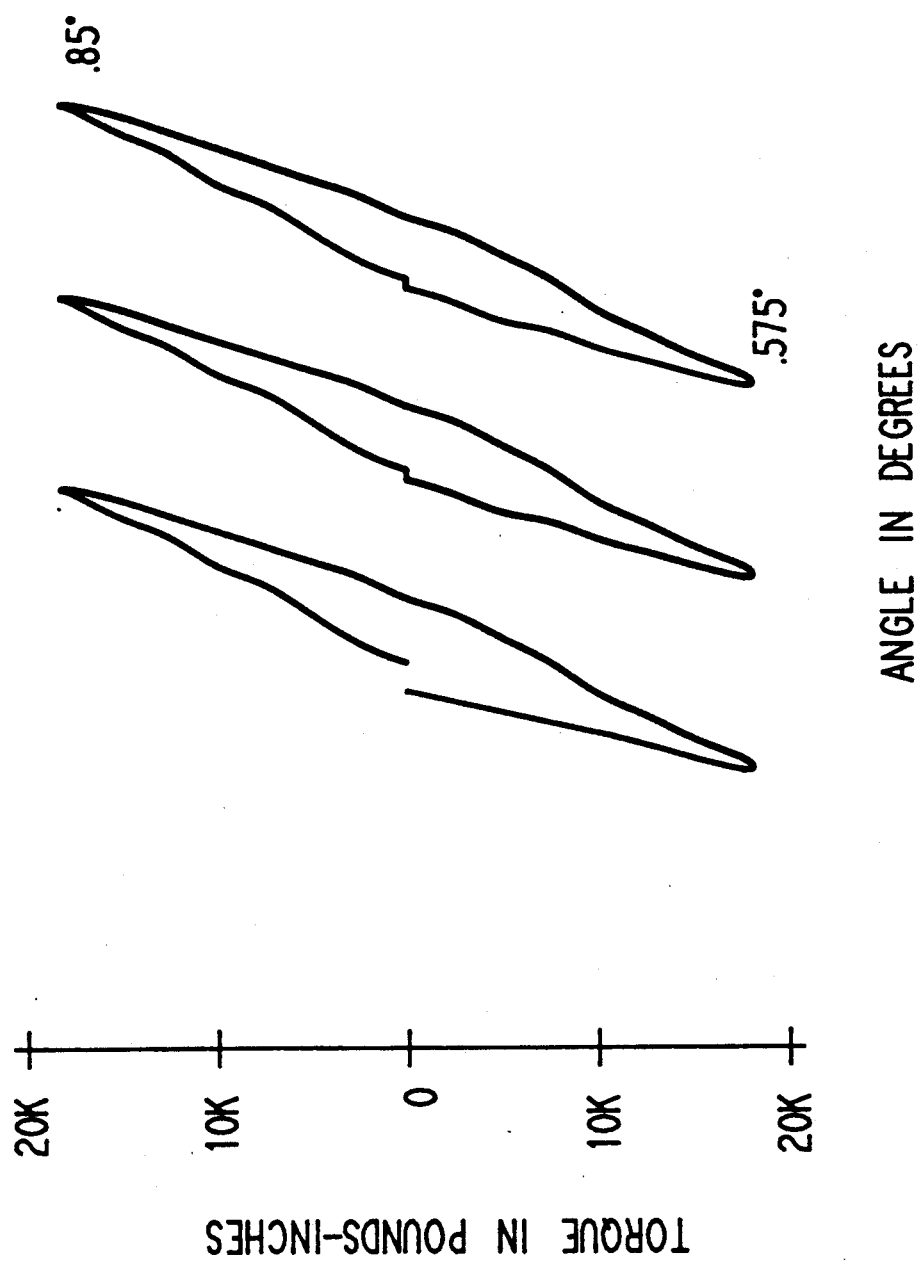
FIG. 6B is a graph of the torque-deflection of the coupling of the invention illustrating elimination of the flat spot in the curve.

A feature of the present invention is the incorporation of axially stiff endless belts into the coupling to provide distinct linear torque-deflection characteristics of the coupling. This feature is accomplished by the removal of looseness and/or shrinkage incurred during assembly. Shrinkage may result during molding of an elastomeric material about the assembled connecting elements. Removal of looseness and/or shrinkage is accomplished by subjecting the connecting member to a prestrain or preload equal to or greater than the compression strains induced due to the looseness and/or during molding and encapsulation of the connecting elements. Preloading the connecting member provides more uniform distribution of the applied torque load among the connecting elements reducing lateral deflection of the coupling, reducing the compression strains on the connecting elements which are unloaded when torque is applied and providing a linear torque-deflection curve as shown in FIG. 6B. Preloading results in eliminating the flat spot of the torque-deflection curve at zero torque. The linearity of the curves in FIG. 6B are evidence the coupling of the present invention has overcome the problem of "snapping" during sudden reversals of rotation.

In the present embodiment, the connecting member may be preloaded from 5% to 25% of the ultimate strength of each connecting element. For example, if the ultimate strength of each connecting element is 8000 pounds, the desired preload is from about 400 to about 2500 pounds. To achieve the desired preload, a suitable radius 46 to the bores 40d, 41d is experimentally determined. The connecting member 44 can then be preloaded by adjusting the radially expanding device to the desired radius 46.

The structure of the connecting member 44 is maintained by encapsulation thereof with a suitable elastomeric material 48. One method to apply the elastomeric material is to place the radially expanding device along with the assembled spools and endless belts into a suitable mold for pressure encapsulation by a molding press. Upon completion of the molding, the encapsulated connecting member may be removed from the radial expanding device. Design details of each coupling will determine the elastomeric material used to encapsulate the connecting member. For instance, the flexibility and thickness will depend on the anticipated torque loads and amount of angular misalignment to be accommodated between the drive and driven members. In certain applications, a low loss type of elastomeric material is preferably utilized to minimize heat build-up and energy loss across the coupling. In addition, the elastomeric material should transfer heat readily out of the connecting member in order to void undesirable heat build-up in the elastomeric material. A preferred elastomeric material is a polyurethane having a tensile modulus from about 300 psi to about 600 psi, and a tensile strength from about 2000 psi to about 3000 psi and an elongation at break from about 800 to about 1200%.

As best seen in FIGS. 1 and 2, the fabricated connecting member 44 is connected to the drive shaft hub 14 and driven shaft hub 18 in accordance with conventional drive assembly techniques. To this end the drive hub 14 is a flat circular plate disposed in a plane orthogonal to the rotational axis $R_s$ of the drive shaft 12. In the present embodiment, the hub 14 includes four equidistantly spaced bores (not shown) extending transversely therethrough for receiving bolts 14a. Each of the bores is radially spaced from the rotational axis corresponding to the radius of the connecting member to maintain the preload of the member. Similarly, the driven shaft hub 18 is a flat circular plate disposed in a plane orthogonal to the rotational axis $R_h$ of the driven drive 16. Also, hub 18 includes four equidistantly spaced bores (now shown) extending transversely there through for receiving bolts 18a. Each of the bores is displaced from the axis of rotational $R_h$ by a radius to maintain the preload of the connecting member 44.

The first end portion of each connecting element of the first group and the second end portion of each connecting element of the second group are connected to the drive hub 14 by bolts 14a. Each bolt has a inwardly tapered portion intermediate of the tread and head portions for ease of assemblage. Each bolt 14a passes transversely through the aligned bores of the drive hubs 14 and of the spool into threaded engagement with a nut 14b. The tapered portion of the bolt 14a allows for the minimal shrinkage the connecting member may undergo prior to assemblage. Similarly, the second end portion of each connecting element of the first group and the first end portion of each connecting element of the second group are connected to the driven hub 18 by respective bolts 18a similar to bolts 14a which transversely pass through the aligned bores of the driven hub 18 and the corresponding spools into threaded engagement with a nut 18b.

Figure 4:
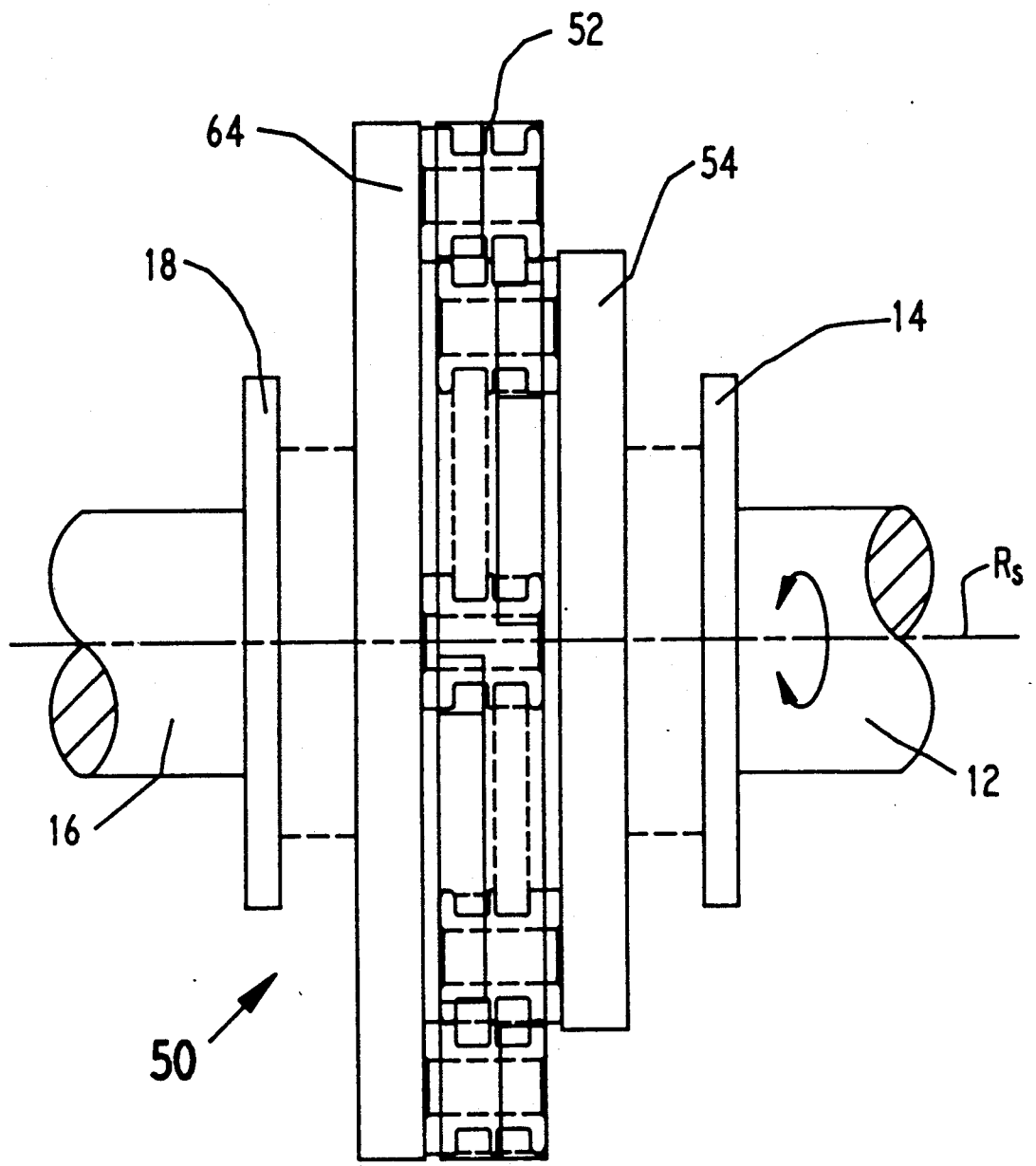
FIG. 4 is another exploded view illustrating attachment of hub assemblies directly to the drive side and driven side connecting elements.
Figure 5:
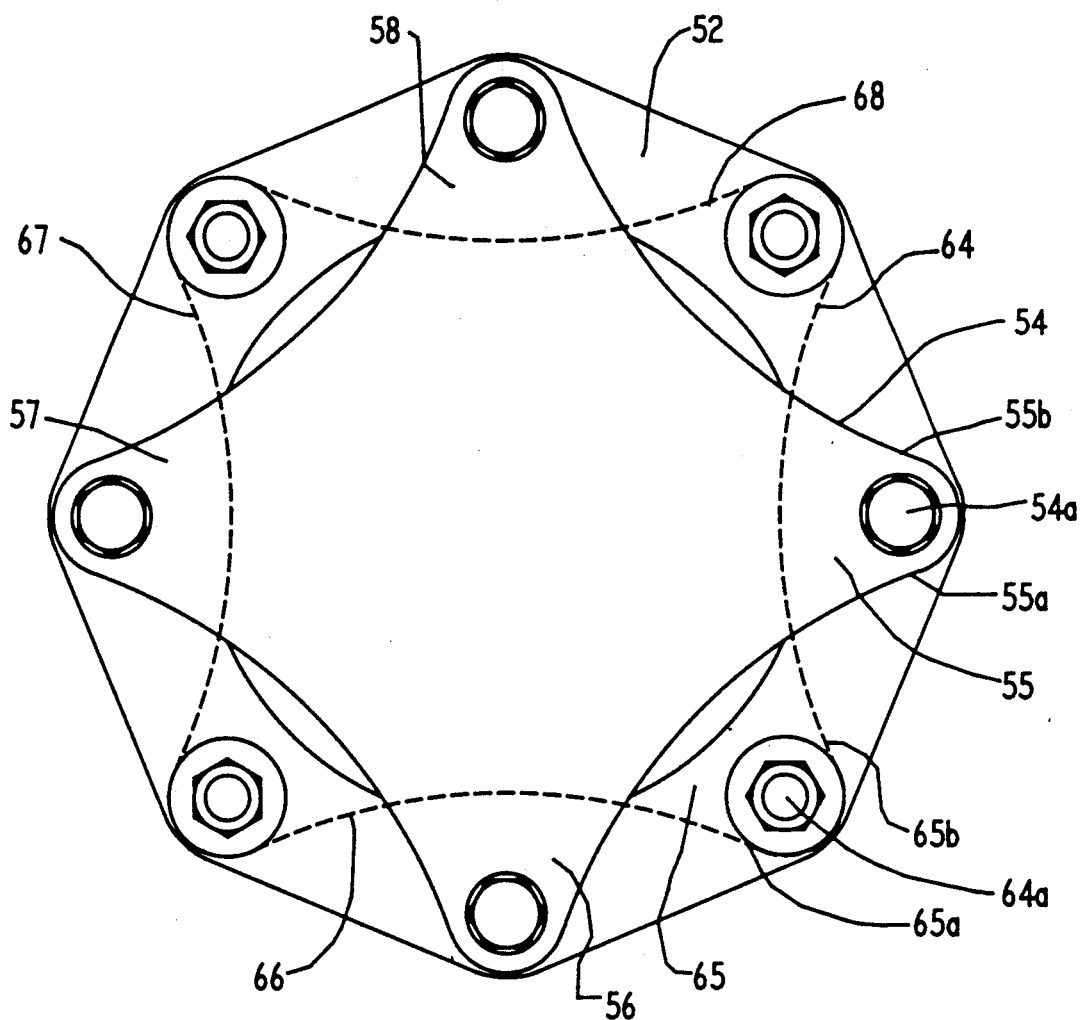
FIG. 5 is a plan view showing an assemblage of two hubs and an intermediate connecting member.

Having described the present invention in one embodiment for use in connecting misaligned shafts, reference is made to an embodiment illustrated in FIGS. 4 and 5 wherein the coupling of the present invention further includes two mounting plates to maintain the preload condition of the connecting member 44. It has been found that upon removal of the connecting member 44 from the molding process, up to 3% shrinkage of the connecting member 44 may be incurred. Such shrinkage detracts from the full advantage of preloading the connecting member 44.

As best seen in FIGS. 4 and 5 the coupling 50 includes a connecting member 52 interconnected between two mounting plates 54 and 64. The connecting member 52 is similar in construction to the connecting member 44 illustrated and described heretofore. Accordingly, references to connecting member 52 will be made based on the numerical designations used for connecting member 44.

As shown in FIGS. 4 and 5, the drive shaft mounting plate 54 is of spider form, including a plurality of generally extending spider arms 55, 56, 57 and 58 disposed in a plane orthogonal to the rotational axis $R_s$ of the drive shaft 12 when assembled. In the illustrated embodiment, four such arms 55, 56, 57 and 58 are provided, the arms being equidistant and equiangularly disposed with respect to the axis of rotational $R_s$. Each arm, such as the arm 55, includes a pair of radially outwardly converging sides 55a and 55b which terminate in an integral section having a threaded bore transversely there through for receiving a bolt 54a. Similarly, the fan shaft mounting plate 64 is of spider form including a plurality of generally extending spider arms 65, 66, 67 and 68 disposed in a plane orthogonal to the rotational axis $R_h$ of the fan shaft 16 when assembled. Each of the arms, such as 65, includes a pair of radially outwardly converging sides 65a and 65b which terminate in an integral section having a threaded bore transversely there through for receiving a bolt 64a. Each of the threaded bolt holes in the mounting plates are radially spaced to maintain the preload radius of the connecting member 52.

Coupling 50 is assembled sandwiching the connecting member 52 between the two mounting plates 54 and 64 such that the drive shaft mounting plate 54 is connected to the first end portions of the connecting elements and the driven shaft mounting plate 64 is connected to the second end portion of the connecting elements. To this end, the first end portions of connecting elements of the first group and the second end portions of connecting elements of the second group are connected to the drive shaft mounting plate 54 by individual bolt 54a. The second end portions of the connecting elements of the first group and the first end portions of connecting elements of the second group are connected to the fan shaft mounting plate 64 by individual bolts 64a. Each bolt such as the bolt 54a transversely passes through the aligned bores of the mounting plates 54 and of the spool into threaded engagement with a nut 54b. The connecting elements are similarly connected to the fan shaft mounting plate 64. The connecting arrangement results in the spider arms of the respective mounting plates 54 and 64 being angularly offset by 45°.

As best seen in FIG. 4, the fabricated coupling 50 is connected to the drive shaft hub 14 and driven shaft hub 18 in accordance with conventional drive assembly techniques. To this end, the hubs 14, 18 include four equidistantly spaced bores extending transversely there through for receiving a bolt threadingly engageable with a corresponding threaded bore (not shown) in the respective mating plate.

In view of the foregoing, it should be apparent that the present invention now provides an improved coupling for connecting a drive shaft to a driven member in a manner permitting the driven member to rotate about an axis in any direction which is misaligned with respect to the rotational axis of the drive shaft. The coupling of the present invention may be used in a variety of applications, such as coupling misaligned drive shafts, or coupling a fan to a drive shaft in a cooling tower. The coupling of the present invention provides a highly desirable reversible connection between the drive and driven members, thereby avoiding the development of undesirable stresses and vibrations in the connected system. Moreover, the connecting elements of the coupling are sufficiently rugged as to meet the aforementioned requirements but are of sufficiently simple construction as to be manufactured readily using available composite manufacturing technologies.

We claim:

1. A rotary coupling for use in connecting drive and driven members to transfer torque between the members when rotated in either direction about axes that may be angularly misaligned with one another comprising:

a plurality of connecting elements disposed in a circumferential orientation about the axes of rotation of said drive and driven members, each connecting element having a first end portion and a second end portion, each connecting element including an elongate endless belt of fiber wrappings, the first end portion of one of said elements overlapping the second end portion of an adjacent element, a rigid bobbin-like spool mounted at each of said overlapping portions of said elements and receiving thereabout respective ends of said elements, alternate ones of said spools adaptable for connection to opposite ones of said drive and driven numbers, an elastomer matrix encapsulating each of said connecting elements, each of said connecting elements being preloaded in tension to maintain said connecting elements in tension during driving rotation of said drive and driven members in either direction while accommodating axial and pivotal relative movement between said drive and driven members, and, a first rigid mounting plate fixedly secured to said one end portion of each of said connecting elements and adapted to be secured to one of said drive and driven members, and a second rigid mounting plate fixedly secured to said second end portion of each of said connecting elements and adapted to be secured to the other of said drive and driven members, said mounting plates maintaining radial spacing of the end portions of said connecting elements from the rotational axis of said drive and driven members preventing radial contraction of the coupling and release of the preloaded tension in said connecting elements.

2. A coupling according to claim 1 wherein each of said connecting elements are preloaded in tension at least about 5% of the ultimate strength in tension of said connecting elements.

3. A coupling according to claim 1 wherein opposite ends of said endless belt of fiber wrappings are looped about adjacent spools.

4. A coupling according to claim 1 wherein said elastomer matrix is a polyurethane and said fiber wrappings are a polyarimid material.

5. A coupling according to claim 1 wherein said elastomeric matrix is a polyurethane having an effective tensile modulus in a range of 300 psi to 600 psi and a tensile strength in a range of 2000 psi to 3000 psi and an elongation at break from 800 to 1200 percent and said fibers are a polyarimid material.

* * * * *

UNITED STATES PATENT OFFICE
CERTIFICATE OF CORRECTION

PATENT NO. : 5,033,988
DATED : Jul. 23, 1991
INVENTOR(S) : Dennis P. McGuire; J. Brian Watson, both of Erie, PA It is certified that error appears in the above-identified patent and that said Letters Patent is hereby corrected as shown below:

Col. 2, text beginning on line 16 should read:

"...members. Virtually all the torque transfer is carried by the belts of the first group, --which are very stiff in tension while the belts of the second group,-- which are very soft in compression carry virtually none of the torque transfer between the members."

Signed and Sealed this

Twenty-second Day of December, 1992

Attest:

DOUGLAS B. COMER

Attesting Officer

Acting Commissioner of Patents and Trademarks